Aug. 25, 1970  W. C. RUTLEDGE  3,525,865
QUANTITATIVE METHOD FOR DETERMINING THE WEIGHT PER
UNIT AREA OF COATINGS APPLIED TO PAPERS
Filed March 23, 1966

INVENTOR.
WYMAN C. RUTLEDGE
BY
ATTORNEY

United States Patent Office 3,525,865
Patented Aug. 25, 1970

---

3,525,865
QUANTITATIVE METHOD FOR DETERMINING THE WEIGHT PER UNIT AREA OF COATINGS APPLIED TO PAPERS
Wyman C. Rutledge, Chillicothe, Ohio, assignor to The Mead Corporation, Dayton, Ohio, a corporation of Ohio
Filed Mar. 23, 1966, Ser. No. 536,893
Int. Cl. G01n *23/02;* G01t *1/17*
U.S. Cl. 250—83.3                     4 Claims

ABSTRACT OF THE DISCLOSURE

The present invention relates to a method of quantitatively measuring the weights of paper coatings by use of the "backscattering" effect of beta rays directed onto the coating applied on a cellulose base and under which is placed a backing sheet of infinite thickness. The difference between the count rate of backscattered beta rays for coated and uncoated paper of the same composition represents a measure of the weight of coating on the coated paper, when compared with calibration curves for each formulation of coating material.

---

Figure 1:
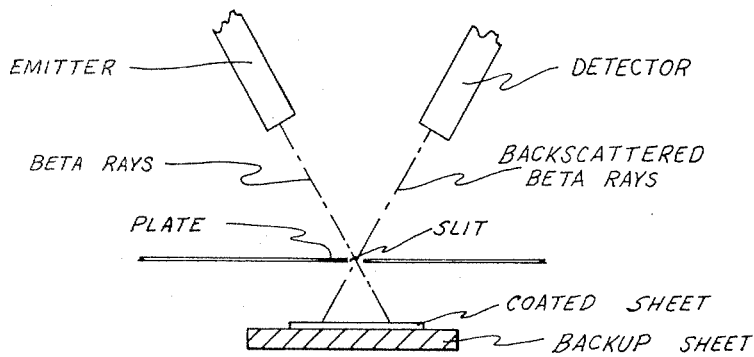

The present invention relates to a method for determining the weight per unit area of materials added to paper. More particularly it relates to a method for determining the weight per unit area of coatings or fillers by the use of beta rays.

In the production of many different types of papers, it is necessary to apply coatings of various types and coat weights in order to obtain papers of desired properties. In producing such papers, it is highly important that coatings of uniform coat weight be applied. In the past, the methods of determining the coat weight of such sheets have been highly unsatisfactory both because of the difficulty in obtaining accurate results and because of the length of time required to make accurate determinations. Both of these factors have made it impractical to regulate promptly during manufacturing operations. It has now been discovered that both of these previous disadvantages can be overcome by using beta rays in determining the coat weight of coatings applied to paper. Both the speed and accuracy of determinations permit the regulation of coating weights during the manufacturing operation so that large batches of coated paper of undesired quality will not be produced.

It is known that when beta rays come in contact with an object, they pass into the object and are repulsed or reflected by the orbital electron field surrounding the atoms comprising the object. Each such repulsion changes the direction of the beta rays and at the same time reduces their velocity. The rays which after perhaps many such repulsions leave the object from the same surface at which they entered the object and referred to as "backscattered" beta particles and use of the latter has been made in determining coating weights. The depth of penetration of the beta particles into the object being measured is proportional not only to the energy of the particle but also to the density of the material which is penetrated. The determination of the coat weight is based on the fact that the intensity of the backscattering will increase with the weight of the coating. However, the deeper a particle penetrates before being repulsed or reflected, the greater becomes the probability that the path will become longer than the maximum range of the particle and that it will be completely absorbed and not backscattered.

In measuring coating weights by means of beta ray backscattering, any of the beta-emitting isotopes can be used providing it has a suitable half-life and emits sufficient beta rays to give practical results. Materials which meet these requirements include radioactive isotopes of krypton, strontium, technetium and thallium. Any of the commercial sources of beta ray emitters can, in general, be used so long as the half-life is not so short as to require frequent checking and resetting of standards. Several companies now manufacture and sell beta ray emitters provided with adjustable slits so that the amount of beta rays directed to an object can be regulated.

The degree of beta ray backscattering can usually be determined by comparing the square roots of the atomic numbers of the elements bombarded by the beta rays. From this it will be evident that measuring systems based on beta ray backscattering will be somewhat more practical if the material to be measured contains elements of higher atomic number such as those customarily present in pigmented paper coatings and fillers, including compounds of such elements as titanium, zinc, iron, barium and calcium. This is particularly the case when measuring coatings containing such materials applied on a cellulose base such as paper since the atomic numbers of the constituents of cellulose are relatively low as compared to the atomic numbers of the constituents of the coating materials. Since beta ray measurements are based on the differences in count rates between the coated and uncoated material, it is evident that the accuracy of the measurement will depend to some extent upon the differences in the atomic numbers of the elements present in the coating and the uncoated base (rawstock), and the greater the differences the more accurate and the more practical the operation becomes. The latter will, of course, depend to a considerable extent upon the types of equipment used, as well as the arrangement and operation thereof.

Many different types of devices are available for the detection of beta rays. The types of such devices best adapted for counting backscattered beta rays in the measurement of coating weights include the scintillation counter, the ionization chamber and the Geiger counter. The particular type of detector used does not constitute a critical part of the present invention.

A read-out device is also required to register and count in an absolute or analogous manner the electrical pulses received from the detector and which are proportional to the number of detected backscattered particles. The absolute read-out device is generally known as a scaler and the analogous device as a ratemeter.

Any of the above types of equipment suitable for emitting, detecting and registering and counting the backscattered beta rays can be used in the present invention.

In making measurements of coating weights using the beta rays backscattering method, it is necessary to place the beta ray emitter and the detector on the same side of the coating being measured. They may be arranged side by side above the slit through which the emitted rays pass to the coating, or they may be placed some distance apart so that the emitted and received rays pass through the slit at an angle of about 10–15 degrees from the perpendicular. In any case, it is necessary to shield the source of the emitted rays so that only the backscattered rays are detected and measured.

In previous attempts to measure the coat weight of coatings on paper by means of beta rays, generally unsatisfactory results have been obtained. It has now been discovered in accordance with the present invention that these previous difficulties are eliminated and satisfactory results are obtained by placing immediately below the coated paper being bombarded with beta rays a backing material or sheet of sufficient thickness and character to prevent the passage therethrough of any substantial proportion of the beta rays used to bombard the coating. A backing sheet of this character and thickness is referred to herein as one of "infinite thickness." Preferably, the backing sheet is of substantially the same chemical composition as the base on which the coating is applied. A convenient backing sheet of this character can be wood of various types such as pine, oak, etc. and a convenient thickness has been found to be approximately one inch. The exact thickness, however, will depend to some extent upon the source of the beta rays and the characteristics of the backing material. Other compositions suitable for use as backing sheets include plastic sheets of a type consisting essentially of carbon, hydrogen and oxygen. The thickness of the particular sheet selected can be readily determined by reference to handbooks showing the penetration of beta rays through such materials.

The specific examples given below will clearly show the advantages of using the backing sheet of infinite thickness in determining the weight of coatings on paper. It will be understood, however, that these examples are for purposes of illustration only and that variations from the specific procedures set forth therein will be obvious to one skilled in the art. It would be obvious that the method illustrated could be used for determining the filler content of paper providing the filler was an element or a compound of an element having an atomic number substantially higher than the elements present in paper. Any such variations which do not depart from the basic concept of the invention disclosed herein are intended to come within the scope of the appended claims.

Figure 2:
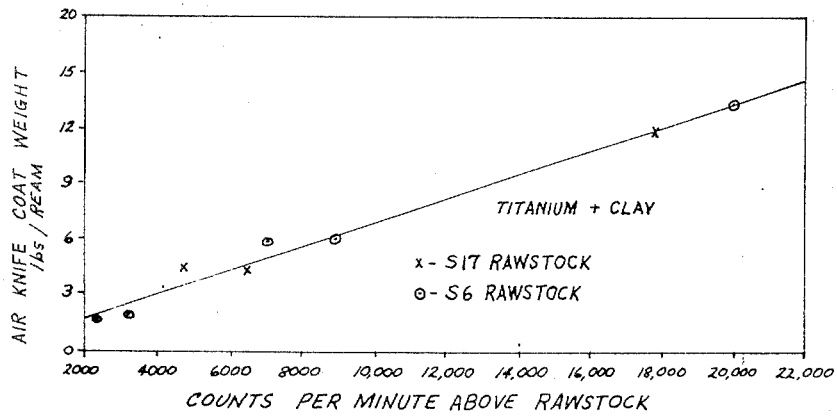
Figure 3:
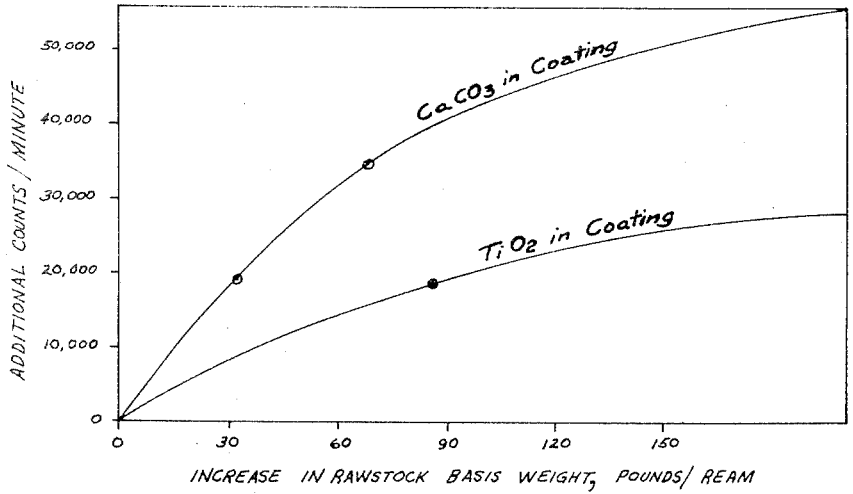

In carrying out the experiments described below, a radio-active krypton isotope (krypton 85) was used as the source of the beta rays. A beta scintillation crystal was used to detect the backscattered beta rays and a nuclear counter was employed to count and record the detected beta rays. The difference in the count rate between the coated and uncoated paper is a measure of the weight of coating on the paper. A calibration curve was determined for each formulation of coating material, this being necessary because of the fact that different elements used in the formulation gave different backscattering counting rates. The general layout of the apparatus is shown in FIG. 1 and typical calibration curves are shown in FIGS. 2 and 3.

The beta ray emitter and the detector were maintained at a constant distance from the coatings and the slit through which the rays passed was likewise maintained constant.

In the following discussion, the weights per unit area are all expressed in pounds per ream, a ream having an area of 3300 square feet.

In order to show the advantages of using backing sheets of infinite thicknesses, paper rawstocks of varying weights were coated with 5.4 pounds of a calcium-containing coating and subjected to beta ray bombardment, both with and without backing sheets of infinite thickness, and the backscattered beta rays were counted. Determinations were similarly made without coatings applied to the sheets. Table I below shows the variation in count rate obtained with variations in rawstock basis weight, both with and without the use of a backing sheet of infinite thickness. The coated reference sample consisted of a 34 pound paper rawstock and 5.5 pound dry coating. The coating comprised 26% calcium carbonate on the basis of total dry weight. When the basis weight of the rawstock was increased, the additional count rate due to this increase was obtained as the difference in the count rate between the sample being tested and the reference sample. Column I shows a very large increase in the count rate of the samples backed only by air, while Column II shows small statistical variations of no real significance for samples backed by an infinite thickness of wood.

TABLE I

| Sample | Additional counts/minute due to increased rawstock basis weight | |
|---|---|---|
| | Column I, air backing | Column II, wood backing |
| Coated reference | 0 | 0 |
| Coated reference plus 34 lb. additional rawstock | 18,670 | +9 |
| Coated reference plus 68 lb. additional rawstock | 22,530 | +30 |
| Coated referecne plus 3,000 lb. additional rawstock | 63,850 | −20 |

The above results are plotted on FIG. 3. From the curve, it will be seen that about 1500 counts/minute were obtained when the basis weight of the rawstock varied by 2#, which would be the equivalent of an error of 1.3# coating, unless the exact composition of the sheet and the number of counts therefrom were accurately known and taken into account. Since the difference in counts/minute between the coated and uncoated reference sheets was found to be 6500 counts/minute, the error obtained without the use of the backing sheet of infinite thickness amounts to ten times the permissible error for a coating with calcium as the predominant reflecting agent.

Table II below shows similar results obtained with a titanium coating. In this case, the coated reference sample consisted of an 86 pound rawstock and a 12.8 pound dry coating (20% $TiO_2$). When the basis weight of the rawstock was increased, the additional count rate due to this increase was obtained as the difference in count rate between the sample being tested and the reference sample. Again, Column I shows a very large increase in the count rate of samples backed only by air, while Column II shows small statistical variations of negligible significance for samples backed by an infinite thickness of wood.

TABLE II

| | Additional counts/minute due to increased rawstock basis weight | |
|---|---|---|
| | Column I, air backing | Column II, wood backing |
| Coated reference | 0 | 0 |
| Coated reference plus 86 lb. additional rawstock | 19,870 | +23 |
| Coated reference plus 3,300 lb. additional rawstock | 27,570 | −17 |

The above results are also shown on the curve in FIG. 3. From the curve, it will be seen that a 2# rawstock error causes an error of 850 counts/minute, when not using the backing of infinite thickness. This error is equivalent to a .8# coat weight error since the count rate due to a 17.8# coating was determined to be 20,050 counts/minute. This error is approximately 10 times the allowable error.

The results given above show that variations in rawstock backing lead to excessive variations in count rates which have no bearing on the coating weights or thicknesses. On the other hand, when the sample is always backed with material or infinite thickness, the variations of the basis weight of the rawstock caused no significant variations in the indicated coat weight when there actually were none.

What is claimed is:

1. Method for the quantitative measurement of the weight per unit area of dried mineral pigment-coatings applied to paper which comprises placing said dried coated paper, coated side up, on a backing sheet of infinite thickness of substantially the same chemical composition as said paper, directing a stream of beta rays onto said coating, measuring the count rate of beta rays backscattered by the mineral pigment of said dried coated paper, comparing the count rate of said backscattered rays with the count rate backscattered by uncoated paper under similar conditions, to obtain a difference in count due to the dried coating, and determining from said difference the weight per unit area of coating.

2. The process of claim 1 wherein the backing sheet of infinite thickness comprises a sheet of uncoated wood.

3. The process of claim 1 wherein the backing sheet of infinite thickness comprises uncoated sheets of paper in sufficient number to prevent substantial passage of beta rays therethrough after passage through the coated sheet.

4. The process of claim 1 wherein the coatings being measured comprise elements selected from the group consisting of titanium, iron, calcium, barium and zinc.

References Cited

UNITED STATES PATENTS 3,019,336 1/1962 Johns _____ 250—43.5
3,143,649 8/1964 Mitchell et al.

OTHER REFERENCES

McMaster, Robert C.: Nondestructive Testing Handbook, vol. I, Ch. 18, pp. 15 and 16, 1963.

RALPH G. NILSON, Primary Examiner

MORTON J. FROME, Assistant Examiner